(12) United States Patent
Yuguchi et al.

(10) Patent No.: US 11,543,308 B2
(45) Date of Patent: Jan. 3, 2023

(54) STRAIN GAUGE (71) Applicant: MINEBEA MITSUMI Inc., Nagano (JP)

(72) Inventors: Akiyo Yuguchi, Shizuoka (JP); Aya Ono, Shizuoka (JP); Eiji Misaizu, Kanagawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 16/650,963

(22) PCT Filed: Sep. 27, 2018

(86) PCT No.: PCT/JP2018/035939
§ 371 (c)(1),
(2) Date: May 11, 2020

(87) PCT Pub. No.: WO2019/065841
PCT Pub. Date: Apr. 4, 2019

(65) Prior Publication Data
US 2020/0271533 A1 Aug. 27, 2020

(30) Foreign Application Priority Data

Sep. 29, 2017 (JP) .............................. JP2017-191823
Mar. 20, 2018 (JP) .............................. JP2018-052421

(51) Int. Cl.
*G01L 1/00* (2006.01)
*G01L 1/22* (2006.01)

(52) U.S. Cl.
CPC ................................. *G01L 1/2287* (2013.01)

(58) Field of Classification Search
CPC ..................................................... G01L 1/2287
See application file for complete search history.

(56) References Cited

U.S. PATENT DOCUMENTS

| 3,867,231 A | 2/1975 | Casey |
| 4,658,233 A | 4/1987 | Uchida et al. |

(Continued)

FOREIGN PATENT DOCUMENTS

| CN | 105755438 | 7/2016 |
| CN | 106768524 | 5/2017 |

(Continued)

OTHER PUBLICATIONS

International Search Report for PCT/JP2018/035939 dated Dec. 18, 2018.

(Continued)

*Primary Examiner* — Max H Noori
(74) *Attorney, Agent, or Firm* — IPUSA, PLLC (57) ABSTRACT

A strain gauge includes a flexible substrate; a resistor formed of material including at least one from among chromium and nickel, on or above the substrate; and electrodes electrically coupled to the resistor. Each electrode includes a terminal section extending from a corresponding end portion from among end portions of the resistor; a first metallic layer formed of copper, a copper alloy, nickel, or a nickel alloy, on or above the terminal section; and a second metallic layer formed of material having better solder wettability than the first metallic layer, on or above the first metallic layer.

15 Claims, 7 Drawing Sheets

(56) References Cited

U.S. PATENT DOCUMENTS

| | | | |
|---|---|---|---|
| 4,737,757 | A | 4/1988 | Senda et al. |
| 4,758,816 | A | 7/1988 | Blessing et al. |
| 4,786,887 | A | 11/1988 | Bringmann et al. |
| 4,876,893 | A | 10/1989 | Kato et al. |
| 4,937,550 | A | 6/1990 | Tawada et al. |
| 5,154,247 | A | 10/1992 | Nishimura et al. |
| 5,328,551 | A | 7/1994 | Kovacich |
| 5,349,746 | A | 9/1994 | Gruenwald et al. |
| 5,455,453 | A | 10/1995 | Harada et al. |
| 5,622,901 | A | 4/1997 | Fukada |
| 5,914,168 | A | 6/1999 | Wakamatsu et al. |
| 6,512,510 | B1 | 1/2003 | Maeda |
| 8,232,026 | B2 | 7/2012 | Kumar et al. |
| 9,256,119 | B2 | 2/2016 | Nam et al. |
| 9,306,207 | B2 | 4/2016 | Woo et al. |
| 11,087,905 | B2 | 8/2021 | Asakawa et al. |
| 2003/0016116 | A1 | 6/2003 | Blaha |
| 2004/0056321 | A1 | 3/2004 | Parsons |
| 2004/0140868 | A1 | 7/2004 | Takeuchi et al. |
| 2005/0160837 | A1 | 7/2005 | Tellenbach et al. |
| 2005/0188769 | A1 | 9/2005 | Moelkner et al. |
| 2005/0276990 | A1 | 12/2005 | Kohara et al. |
| 2008/0253085 | A1* | 10/2008 | Soffer .............. G06F 1/18 361/679.4 |
| 2011/0109701 | A1 | 5/2011 | Ohashi |
| 2012/0190166 | A1 | 7/2012 | Okuda |
| 2013/0082970 | A1* | 4/2013 | Frey ............. G06F 3/04144 345/173 |
| 2013/0181808 | A1 | 7/2013 | Chen et al. |
| 2013/0300254 | A1 | 11/2013 | Fujii et al. |
| 2015/0188769 | A1 | 7/2015 | Gu |
| 2015/0276517 | A1* | 10/2015 | Ashida ........... G01L 1/2293 73/862.045 |
| 2015/0296607 | A1* | 10/2015 | Yang ............... G01L 1/205 361/750 |
| 2015/0348900 | A1 | 12/2015 | Nishimura et al. |
| 2016/0114584 | A1 | 4/2016 | Abbot, Jr. et al. |
| 2016/0282205 | A1 | 9/2016 | Huo et al. |
| 2016/0372606 | A1 | 12/2016 | Ito et al. |
| 2017/0123548 | A1 | 5/2017 | Shih et al. |
| 2017/0261388 | A1 | 9/2017 | Ma et al. |
| 2017/0336900 | A1 | 11/2017 | Lee et al. |
| 2017/0363486 | A1* | 12/2017 | Okulov ............ G01L 1/005 |
| 2017/0370796 | A1 | 12/2017 | Dusing et al. |
| 2018/0217016 | A1 | 8/2018 | Inamori et al. |
| 2018/0275001 | A1 | 9/2018 | Tokuda |
| 2020/0076016 | A1* | 3/2020 | Riemer ........... H01M 10/6571 |
| 2020/0271533 | A1 | 8/2020 | Yuguchi et al. |
| 2020/0292294 | A1* | 9/2020 | Misaizu ............ H01C 3/12 |
| 2020/0333199 | A1 | 10/2020 | Asakawa et al. |
| 2021/0003378 | A1 | 1/2021 | Asakawa et al. |
| 2021/0018382 | A1* | 1/2021 | Misaizu ............ G01B 7/16 |
| 2021/0033476 | A1* | 2/2021 | Toda ............... G01B 7/18 |
| 2021/0063259 | A1 | 3/2021 | Misaizu et al. |
| 2021/0247210 | A1 | 8/2021 | Asakawa et al. |
| 2021/0270683 | A1 | 9/2021 | Kitamura et al. |

FOREIGN PATENT DOCUMENTS

| | | |
|---|---|---|
| CN | 111417830 | 7/2020 |
| EP | 0171467 | 2/1986 |
| EP | 725392 | 8/1996 |
| EP | 1197737 | 4/2002 |
| EP | 1530708 | 5/2005 |
| EP | 3690385 | 8/2020 |
| JP | S49-042780 | 4/1974 |
| JP | S58-097607 | 6/1983 |
| JP | S58-169150 | 10/1983 |
| JP | S61-176803 | 8/1986 |
| JP | S63-245962 | 10/1988 |
| JP | H01-202601 | 8/1989 |
| JP | H02-189981 | 7/1990 |
| JP | H03-191802 | 8/1991 |
| JP | H04-038402 | 2/1992 |
| JP | H04-095738 | 3/1992 |
| JP | H05-080070 | 3/1993 |
| JP | H05-145142 | 6/1993 |
| JP | H06-176903 | 6/1994 |
| JP | H06-300649 | 10/1994 |
| JP | H07-113697 | 5/1995 |
| JP | H07-306002 | 11/1995 |
| JP | H08-102163 | 4/1996 |
| JP | H08-304200 | 11/1996 |
| JP | H09-016941 | 1/1997 |
| JP | H09-197435 | 7/1997 |
| JP | H10-270201 | 10/1998 |
| JP | 2002-221453 | 8/2002 |
| JP | 2003-097906 | 4/2003 |
| JP | 2003-324258 | 11/2003 |
| JP | 2004-072715 | 3/2004 |
| JP | 2006-170707 | 6/2006 |
| JP | 2007-173544 | 7/2007 |
| JP | 2010-070850 | 4/2010 |
| JP | 2012-151338 | 8/2012 |
| JP | 2013-117422 | 6/2013 |
| JP | 2013-217763 | 10/2013 |
| JP | 2014-074661 | 4/2014 |
| JP | 2015-031633 | 2/2015 |
| JP | 2016-017882 | 2/2016 |
| JP | 2016-074934 | 5/2016 |
| JP | 2016-136605 | 7/2016 |
| JP | 2016-225598 | 12/2016 |
| JP | 2017-067764 | 4/2017 |
| JP | 2017-129417 | 7/2017 |
| JP | 2017-210572 | 11/2017 |
| JP | 2017-210573 | 11/2017 |
| JP | 2019-066312 | 4/2019 |
| JP | 2019-066313 | 4/2019 |
| JP | 2019-066454 | 4/2019 |
| WO | 2004/074800 | 9/2004 |
| WO | 2017094368 | 6/2017 |

OTHER PUBLICATIONS

Office Action dated Oct. 8, 2020 (U.S. Appl. No. 16/758,506).
International Search Report for PCT/JP2018/040357 dated Jan. 15, 2019.
Extended European Search Report dated Jun. 17, 2021 with respect to the corresponding European Patent Application No. 18863695.5.
Office Action dated Jun. 1, 2021 with respect to the related Chinese Patent Application No. 201880084755.0.
Office Action dated Dec. 7, 2021 with respect to the related Japanese patent application No. 2020-098850.
Office Action dated Jan. 6, 2022 with respect to the related Chinese patent application No. 201880076750.3.
Office Action dated Jan. 13, 2022 with respect to the related Chinese patent application No. 201880084755.0.
Extended European Search Report dated May 10, 2021 (EP Patent Application No. 18862478.7).
International Search Report for PCT/JP2018/035706 dated Dec. 11, 2018.
Japanese Office Action for 2017-191820 dated Mar. 17, 2020.
International Search Report for PCT/JP2018/035713 dated Dec. 11, 2018.
Extended European Search Report dated May 10, 2021 (EP Patent Application No. 18860865.7).
American Technical Publishers Ltd.: "ASM Ready Reference: Thermal Properties of Metals", Apr. 27, 2021 (Apr. 27, 2021), pp. 1-9, XP055799057, Retrieved from the Internet: URL:https://www.owlnet.rice.edu/~msci301/ThermalExpansion.pdf [retrieved on Apr. 27, 2021].
International Search Report for PCT/JP2018/035727 dated Dec. 18, 2018.
Yujiro Sakurauchi, "Handbook for utilizing industrial materials", Jan. 25, 1989, pp. 114-149, 166-169, 174-175, 226-235.
Mars J R: "New Strain Gages Are Similar To Thin Film Resistors, Permit Analysys of Multilayer Boards", Insulation, Circuits, Lake Publishing Co., Libertyville, IL, US, vol. 19, No. 11, Oct. 1, 1973 (Oct. 1, 1973), pp. 35-37, XP009047141, ISSN: 0020-4544 "the whole document".

(56) References Cited

OTHER PUBLICATIONS

Office Action dated May 28, 2021 with respect to the related Chinese patent application No. 201880076801 2.
Extended European Search Report dated Jun. 4, 2021 with respect to the related European patent application No. 18860610.7.
Office Action dated Dec. 7, 2021 with respect to the related Japanese patent application No. 2017-191821.
Office Action dated Jan. 6, 2022 with respect to the related Chinese patent application No. 201880076443.5.
Office Action dated Jan. 12, 2022 with respect to the related Chinese patent application No. 201880076801 2.
Office Action dated Dec. 7, 2021 with respect to the corresponding Japanese patent application No. 2017-210571.
Office Action dated Sep. 27, 2021 with respect to the related Chinese patent application No. 201880089676 9.
International Search Report for PCT/JP2018/046854 dated Feb. 12, 2019.
Office Action dated Jan. 25, 2022 with respect to the related Japanese patent application No. 2017-246871.
Office Action dated Jan. 28, 2022 with respect to the related U.S. Appl. No. 16/955,329.
International Search Report for PCT/JP2019/014528 dated Jun. 25, 2019.
Shintaku, Kazuhiko, "Thin-film manufacturing by a sputtering method and its application", The 1st joint education workshop of National Institute of Technology, Akita College, [online], 2014, [retrieval date Jun. 17, 2019] Internet: URL http://akita-nct.coop-edu.jp/assets/uploads/2014/12/6c13667c41571e8378dc2994ce1fcbd4.pdf, non-official translation, published on Dec. 9, 2014. With Partial English Translation.
Office Action dated Dec. 27, 2021 with respect to the related U.S. Appl. No. 16/650,553.
Office Action dated Apr. 12, 2022 with respect to the corresponding Japanese patent application No. 2018-052421.
Office Action dated Apr. 12, 2022 with respect to the related Japanese patent application No. 2018-052422.
Office Action dated Jun. 6, 2022 with respect to the corresponding U.S. Appl. No. 16/650,553.
Office Action dated Jun. 6, 2022 with respect to the corresponding U.S. Appl. No. 17/043,898.
Office Action dated May 5, 2022 with regard to the related Chinese patent application No. 201980022374.4 (With Partial Translation).
Office Action dated Apr. 29, 2022 with regard to the related Chinese patent application No. 201880089676.9 (With Partial Translation).
Office Action dated Sep. 6, 2022 with respect to the related Japanese patent application No. 2017-191821.
Office Action dated Sep. 6, 2022 with respect to the related Japanese patent application No. 2017-210571.
Office Action dated Sep. 6, 2022 with respect to the related Japanese patent application No. 2020-098850.
C. Rebholz et al., "Structure, mechanical and tribological properties of nitrogen-containing chromium coatings prepared by reactive magnetron sputtering", Surface and Coatings Technology, vol. 115, Issues 2-3, pp. 222-229, Jul. 18, 1999.
Haruhiro Kobayashi, Nikkan Kogyo Shimbun, Ltd., "Sputter thin film—Fundamentals and Applications", 1st Edition, 1st Printing, p. 102-107, Feb. 25, 1993 (With Partial Translation).
Shigeru Ikeda et al., Osaka National Research Institute, AIST, "Improvement of Oxidation Resistivity of Carbon Material by Borosilicate Glass Impregnation", TANSO, 1994, No. 162, p. 84-91, Jun. 28, 2010.
Kyoritsu Shuppan Co., Ltd., "Dictionary of Crystal Growth", 1st Edition, 1st Printing, p. 50-51, Jul. 25, 2001 (With Partial Translation).
Iwanami Shoten, Publishers., "Dictionary of Chemistry", 4th Edition, 7th Printing, p. 364, Jul. 20, 1992 (With Partial Translation).
Office Action dated Oct. 11, 2022 with respect to the related Japanese patent application No. 2017-246871.
Office Action dated Oct. 18, 2022 with respect to the related Japanese patent application No. 2018-052421.
Office Action dated Oct. 18, 2022 with respect to the related Japanese patent application No. 2018-052422.
Office Action dated Nov. 8, 2022 with respect to the related Japanese patent application No. 2018-073438.
Japan Metal Society,"Metal Data Book", 4th Edition, 4th Printing, pp. 132, Jul. 10, 2008 (With Partial Translation).

* cited by examiner

STRAIN GAUGE

TECHNICAL FIELD

The present invention relates to a strain gauge.

BACKGROUND ART

A strain gauge is known to be attached to a measured object to detect strain on the measured object. The strain gauge includes a resistor that detects strain, and as resistor material, for example material including Cr (chromium) or Ni (nickel) is used. For example, both ends of the resistor are used as electrodes, and a lead wire for an external connection, or the like is jointed with solder, between the electrodes (see, for example, Patent document 1).

CITATION LIST

Patent Document

[Patent document 1] Japanese Unexamined Patent Application Publication No. 2016-74934

SUMMARY

However, a resistor has a thin film thickness and when both ends of the resistor are used as electrodes dissolution of metallization easily occurs, which results in less solderability. Further, when material including Cr (chromium) or Ni (nickel) is used for the resistor, solderability further gets worse. Particularly, Cr forms an autoxidized film and thus solderability gets worse.

In view of the point described above, an object of the present invention is to improve solderability of an electrode with respect to a strain gauge in which material including Cr (chromium) or Ni (nickel) is used for a resistor.

A strain gauge includes a flexible substrate; a resistor formed of material including at least one from among chromium and nickel, on or above the substrate; and electrodes electrically coupled to the resistor. Each electrode includes a terminal section extending from a corresponding end portion from among end portions of the resistor; a first metallic layer formed of copper, a copper alloy, nickel, or a nickel alloy, on or above the terminal section; and a second metallic layer formed of material having better solder wettability than the first metallic layer, on or above the first metallic layer.

Effects of the Invention

According to the disclosed technique, with respect to a strain gauge in which material including Cr (chromium) or Ni (nickel) is used for a resistor, solderability of an electrode can be improved.

DESCRIPTION OF EMBODIMENTS

One or more embodiments will be hereinafter described with reference to the drawings. In each figure, the same numeral numbers denote the same components; accordingly, duplicative explanations may be omitted.

First Embodiment

Figure 1:
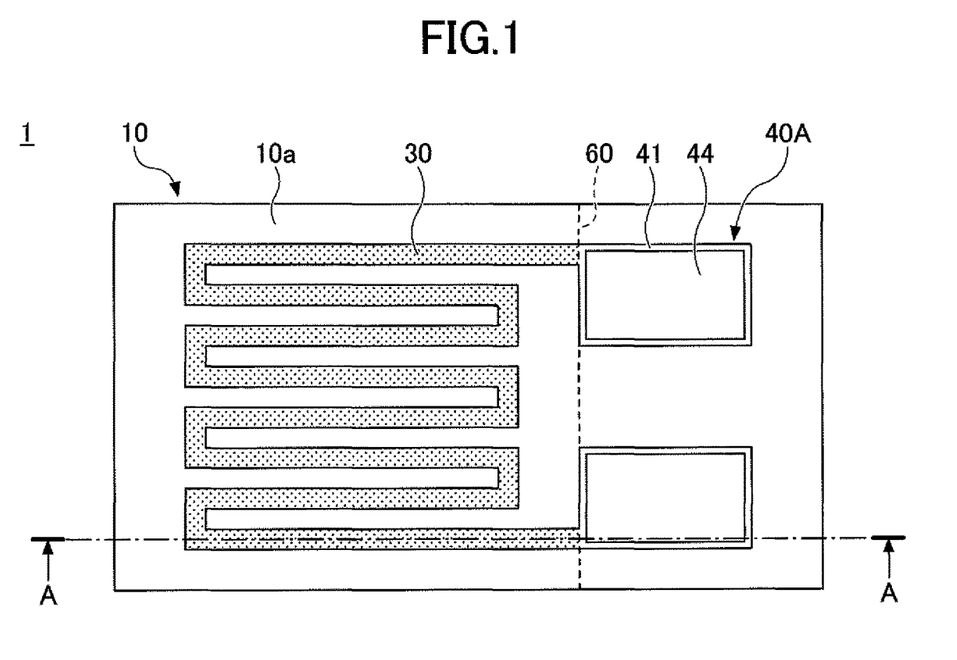
FIG. 1 is a plan view of an example of a strain gauge according to a first embodiment.
Figure 2:
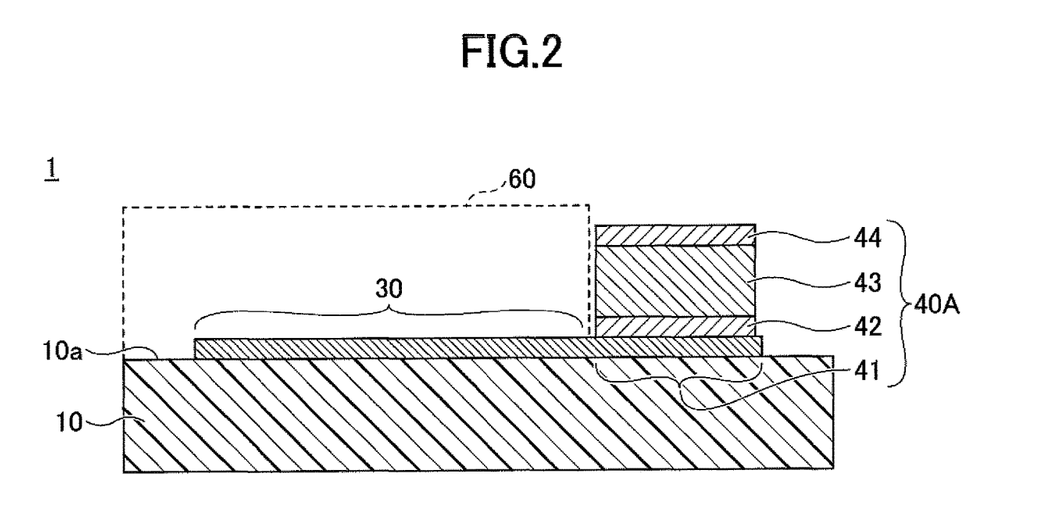
FIG. 2 is a cross-sectional view (part 1) of an example of the strain gauge according to the first embodiment.

FIG. 1 is a plan view of an example of a strain gauge according to a first embodiment. FIG. 2 is a cross-sectional view of an example of the strain gauge according to the first embodiment, and illustrates a cross section taken along the A-A line in FIG. 1. With reference to FIGS. 1 and 2, the strain gauge 1 includes a substrate 10, a resistor 30, and electrodes 40A.

Note that in the present embodiment, for the sake of convenience, with respect to the strain gauge 1, the side of the substrate 10 where the resistor 30 is provided is referred to as an upper side or one side; and the side of the substrate 10 where the resistor 30 is not provided is referred to as a lower side or another side. Further, for each component, the surface on the side where the resistor 30 is provided is referred to as one surface or an upper surface; and the surface on the side where the resistor 30 is not provided is referred to as another surface or a lower surface. However, the strain gauge 1 can be used in a state of being upside down, or be disposed at any angle. Further, a plan view means that an object is viewed from a normal direction of an upper surface 10a of the substrate 10, and a planar shape refers to a shape of an object when viewed from the normal direction of the upper surface 10a of the substrate 10.

The substrate 10 is a member that is a base layer for forming the resistor 30 or the like and is flexible. The thickness of the substrate 10 is not particularly restricted, and can be appropriately selected for any purpose. For example, such a thickness can be approximately between 5 μm and 500 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

The resistor 30 is a thin film formed in a predetermined pattern and is a sensitive section where resistance varies according to strain. The resistor 30 may be formed directly on the upper surface 10a of the substrate 10, or be formed above the upper surface 10a of the substrate 10, via other layer(s). Note that, in FIG. 1, for the sake of convenience, the resistor 30 is illustrated in a crepe pattern.

The resistor 30 can be formed of, for example, material including Cr (chromium); material including Ni (nickel); or material including both of Cr and Ni. In other words, the resistor 30 can be formed of material including at least one from among Cr and Ni. An example of the material including Cr includes a Cr composite film. An example of the material including nickel includes Cu—Ni (copper nickel). An example of the material including both of Cr and Ni includes Ni—Cr (nickel chromium).

Here, the Cr composite film is a composite film of Cr, CrN, $Cr_2N$, and the like. The Cr composite film may include incidental impurities such as chromium oxide.

The thickness of the resistor 30 is not particularly restricted, and can be appropriately selected for any purpose. The thickness can be, for example, approximately between 0.05 μm and 2 μm. In particular, when the thickness of the resistor 30 is 0.1 μm or more, it is preferable in terms of improvement in crystallinity (e.g., crystallinity of α-Cr) of a crystal that constitutes the resistor 30, and when the thickness of the resistor 30 is 1 μm or less, it is further preferable in terms of reduction in cracks of a given film caused by internal stress of the film that constitutes the resistor 30, or reduction in warp in the substrate 10.

For example, when the resistor 30 is the Cr composite film, the resistor is formed with α-Cr (alpha-chromium) as the main component having a stable crystalline phase, so that stability of the gauge characteristics can be improved. Additionally, when the resistor 30 is formed with α-Cr as the main component, the gauge factor of the strain gauge 1 can be 10 or more, as well as a gauge factor temperature coefficient TCS and temperature coefficient of resistance TCR can be each in the range of from −1000 ppm/° C. to +1000 ppm/° C. Here, a main component means that a target substance has 50% by weight or more of total substances that constitute the resistor. The resistor 30 preferably includes α-Cr of 80% by weight or more, from the viewpoint of improving the gauge characteristics. Note that α-Cr is Cr having a bcc structure (body-centered cubic structure).

The electrodes 40A respectively extend from both end portions of the resistor 30 and are each wider than the resistor 30 to be in an approximately rectangular shape, in a plan view. The electrodes 40A are a pair of electrodes from which a change in a resistance value of the resistor 30 according to strain is output externally, where, for example, a lead wire for an external connection, or the like is joined. For example, the resistor 30 extends zigzagged back and forth from one of the electrodes 40A to another electrode 40A.

Each electrode 40A has a laminated structure in which a plurality of metallic layers are laminated. Specifically, each electrode 40A includes a terminal section 41 extending from a corresponding end portion from among both end portions of the resistor 30; a metallic layer 42 formed on an upper surface of the terminal section 41; a metallic layer 43 formed on an upper surface of the metallic layer 42; and a metallic layer 44 formed on an upper surface of the metallic layer 43. Note that for the sake of convenience, the resistor 30 and the terminal sections 41 are expressed by different numerals. However, the resistor and the terminal sections can be integrally formed of the same material, in the same process. The metallic layer 43 is a typical example of a first metallic layer according to the present invention, and the metallic layer 44 is a typical example of a second metallic layer according to the present invention.

The material of the metallic layer 42 is not particularly restricted, and can be appropriately selected for any purpose. For example, Cu (copper) can be used. The thickness of the metallic layer 42 is not particularly restricted, and can be appropriately selected for any purpose. For example, the thickness can be approximately in the range of from 0.01 μm to 1 μm.

Preferably, the material of the metallic layer 43 includes Cu, a Cu alloy, Ni, or a Ni alloy. The thickness of the metallic layer 43 is determined in consideration of solderability to the electrode 40A, and is preferably 1 μm or more, and more preferably 3 μm or more. When the material of the metallic layer 43 includes Cu, a Cu alloy, Ni, or a Ni alloy and the thickness of the metallic layer 43 is 1 μm or more, dissolution of metallization is ameliorated. Also, when the material of the metallic layer 43 includes Cu, a Cu alloy, Ni, or a Ni alloy and the thickness of the metallic layer 43 is 3 μm or more, dissolution of metallization is further ameliorated. Note that the thickness of the metallic layer 43 is preferably 30 μm or less in terms of ease of electrolytic plating.

Here, the dissolution of metallization means that the material constituting the electrode 40A is dissolved in solder for jointing the electrode 40A, and that the thickness of electrode 40A is reduced or the material disappears. When the dissolution of metallization occurs, adhesion strength or tensile strength with a lead wire, or the like to be jointed to the electrode 40A may be reduced. Thus, it is preferable that no dissolution of metallization occur.

For the material of the metallic layer 44, material having better solder wettability than the metallic layer 43 can be selected. For example, when the material of the metallic layer 43 includes Cu, a Cu alloy, Ni, or a Ni alloy, the material of the metallic layer 44 can include Au (gold). When the surface of Cu, a Cu alloy, Ni, or a Ni alloy is coated with Au, oxidation and corrosion for Cu, a Cu alloy, Ni, or a Ni alloy can be prevented, as well as good solder wettability can be provided. Instead of Au, when the material of the metallic layer 44 includes Pt (platinum), the metallic layer 44 has the same effect. The thickness of the metallic layer 44 is riot particularly restricted, and can be appropriately selected for any purpose. For example. the thickness can be approximately between 0.01 μm and 1 μm.

Note that each terminal section 41 is exposed around a given laminated section of the metallic layers 42, 43, and 44, in a plan view. However, each terminal section 41 may have the same planar shape as the laminated section of the metallic layers 42, 43, and 44.

A cover layer 60 (insulating resin layer) may be disposed on and above the upper surface 10*a* of the substrate 10, such that the resistor 30 is coated and the electrodes 40A are exposed. With the cover layer 60 being provided, mechanical damage, and the like can be prevented from occurring in the resistor 30. Additionally, with the cover layer 60 being provided, the resistor 30 can be protected against moisture, and the like. Note that the cover layer 60 may be provided to cover all portions except for the electrodes 40A.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted, and can be appropriately selected for any purpose. For example, the thickness may be approximately between 2 μm and 30 μm.

FIGS. 3A to 4D are diagrams illustrating a process of manufacturing the strain gauge according to the first embodiment, and each illustrate a cross section corresponding to FIG. 2. In order to manufacture the strain gauge 1, first, in the process illustrated in FIG. 3A, the substrate 10 is prepared and the metallic layer 300 is formed on the upper surface 10*a* of the substrate 10. The metallic layer 300 is finally patterned to become a layer that constitutes the resistor 30 and the terminal sections 41. In this case, the material and thickness of the metallic layer 300 are the same as the material and thickness for each of the resistor 30 and the terminal sections 41, as described above.

Figure 3A:
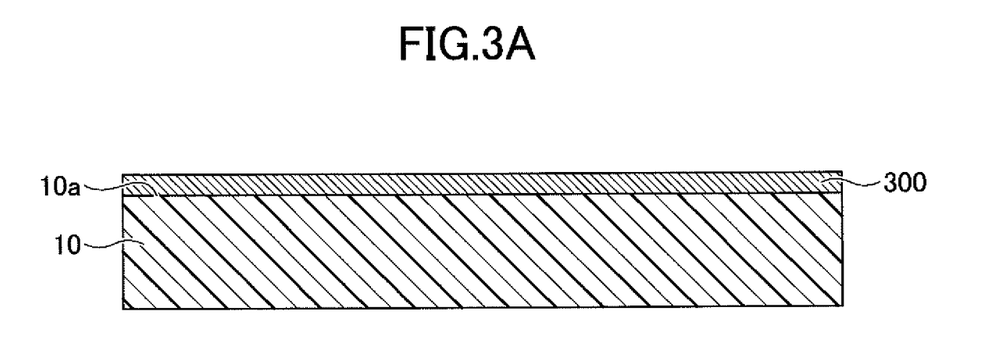
FIG. 3A is a diagram (part 1) illustrating an example of a process of manufacturing the strain gauge according to the first embodiment.

The metallic layer 300 can be deposited by magnetron sputtering in which, for example, a raw material capable of forming the metallic layer 300 is the target. Instead of magnetron sputtering, the metallic layer 300 may be deposited by reactive sputtering, vapor deposition, arc ion plating, pulsed laser deposition, or the like.

From the viewpoint of stabilizing the gauge characteristics, before depositing the metallic layer 300, preferably, as a base layer, a functional layer having a film thickness that is approximately between 1 nm and 100 nm is vacuum-deposited on the upper surface 10*a* of the substrate 10, by conventional sputtering, for example.

In the present application, the functional layer refers to a layer that has a function of promoting crystal growth of the metallic layer 300 (resistor 30) that is at least an upper layer. The functional layer preferably further has a function of preventing oxidation of the metallic layer 300 caused by oxygen and moisture included in the substrate 10, as well as a function of improving adhesion between the substrate 10 and the metallic layer 300. The functional layer may further have other functions.

The insulating resin film that constitutes the substrate 10 contains oxygen and moisture. In this regard, particularly when the metallic layer 300 includes Cr (chromium), it is effective for the functional layer to have a function of preventing oxidation of the metallic layer 300, because Cr forms an autoxidized film.

The material of the functional layer is not particularly restricted as long as it is material having a function of promoting crystal growth of the metallic layer 300 (resistor 30) that is at least an upper layer. Such material can be appropriately selected for any purpose, and includes one or more types of metals selected from a group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron). Mo (molybdenum), W (tungsten), Ru (ruthenium), Rh (rhodium), Re (rhenium), Os (osmium), Ir (iridium), Ft; (platinum), Pd (palladium), Ag (silver), Au (gold), Co (cobalt.), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10*a* of the substrate 10 is etched with Ar. Thus, a deposited amount of films of the functional layer is minimized and thus an effect of improving adhesion can be obtained.

However, this is an example of a method of depositing the functional layer, and the functional layer may be formed by other methods. For example, before depositing the functional layer, the upper surface 10*a* of the substrate 10 is activated by plasma treatment, etc. using Ar, or the like to thereby obtain the effect of improving the adhesion; subsequently, the functional layer may be vacuum-deposited by magnetron sputtering.

A combination of the material, of the functional layer and the material of the metallic layer 300 is not particularly restricted, and can be appropriately selected for any purpose. For example, Ti is used for the functional layer, and a Cr composite film formed with α-Cr (alpha-chromium) as the main component can be deposited as the metallic layer 300.

In this case, the metallic layer 300 can be deposited by, for example, magnetron sputtering in which a raw material capable of forming the Cr composite film is the target and in which an Ar gas is supplied to a chamber. Alternatively, the metallic layer 300 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and a Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR can be each in the range of from −1000 ppm/° C. to +1000 ppm/° C. Note that, when the functional layer is formed of Ti, the Cr composite film may include Ti or TiN (titanium nitride).

Note that when the metallic layer 300 is a Cr composite film, the functional layer formed of Ti includes all functions being a function of promoting crystal growth of the metallic layer 300; a function of preventing oxidation of the metallic layer 300 caused by oxygen or moisture contained in the substrate 10; and a function of improving adhesion between the substrate 10 and the metallic layer 300. Instead of Ti, when the functional layer is formed of Ta, Si, Al, or Fe, the functional, layer also includes the same functions.

As described above, with the functional layer being provided in the lower layer of the metallic layer 300, the crystal growth of the resistor 30 can be promoted and thus the metallic layer 300 having a stable crystalline phase can be fabricated. As a result, with respect to the strain gauge 1, the stability of the gauge characteristics can be improved. Also, the material that constitutes the functional layer is diffused into the metallic layer 300, so that the gauge characteristics of the strain gauge 1 can be thereby improved.

Figure 3B:
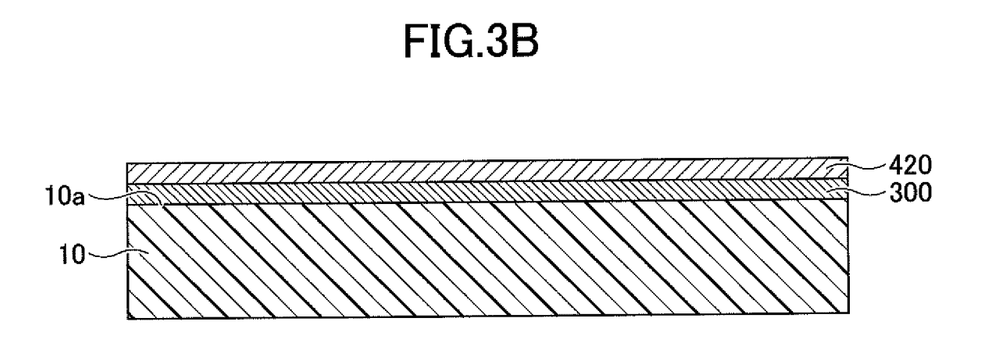
FIG. 3B is a diagram (part 2) illustrating an example of the process of manufacturing the strain gauge according to the first embodiment.

Next, in the process illustrated in FIG. 3B, a seed layer 420 as the metallic layer 42 is formed by, for example, sputtering, electroless plating, or the like, to cover an upper surface of the metallic layer 300.

Figure 3C:
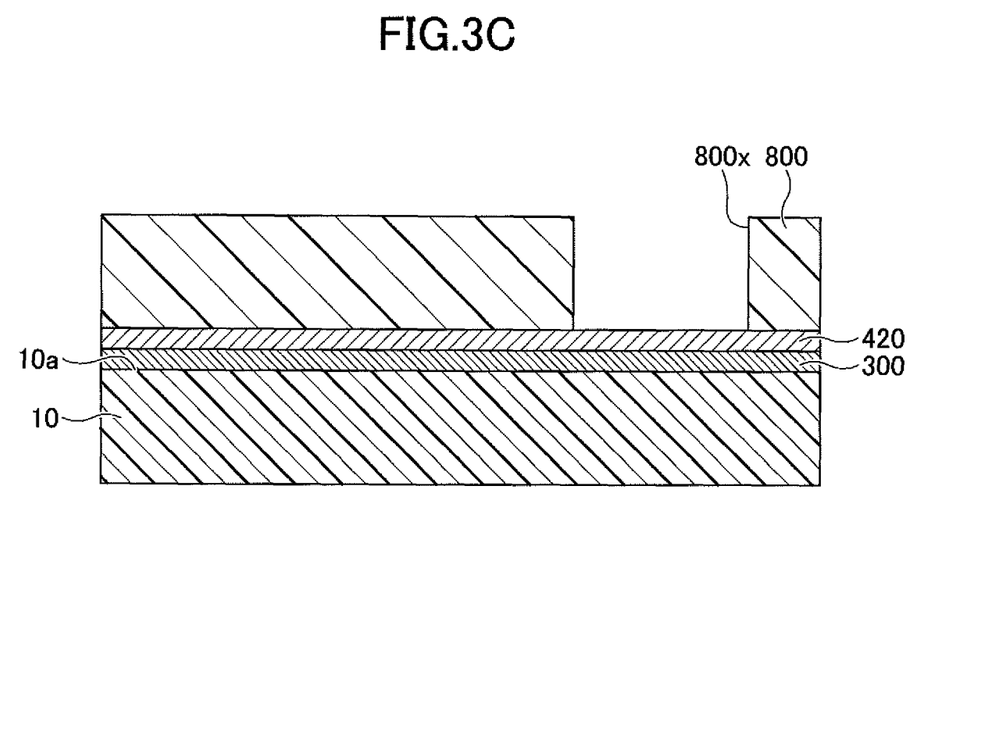
FIG. 3C is a diagram (part 3) illustrating an example of the process of manufacturing the strain gauge according to the first embodiment.

Next, in the process illustrated in FIG. 3C, a photosensitive resist 800 is formed on the entire upper surface of the seed layer 420, and by exposing and developing, an opening 800x, which is for exposing a region in which each electrode 40A is formed, is formed. As the resist 800, for example, a dry film resist, or the like can be used.

Figure 3D:
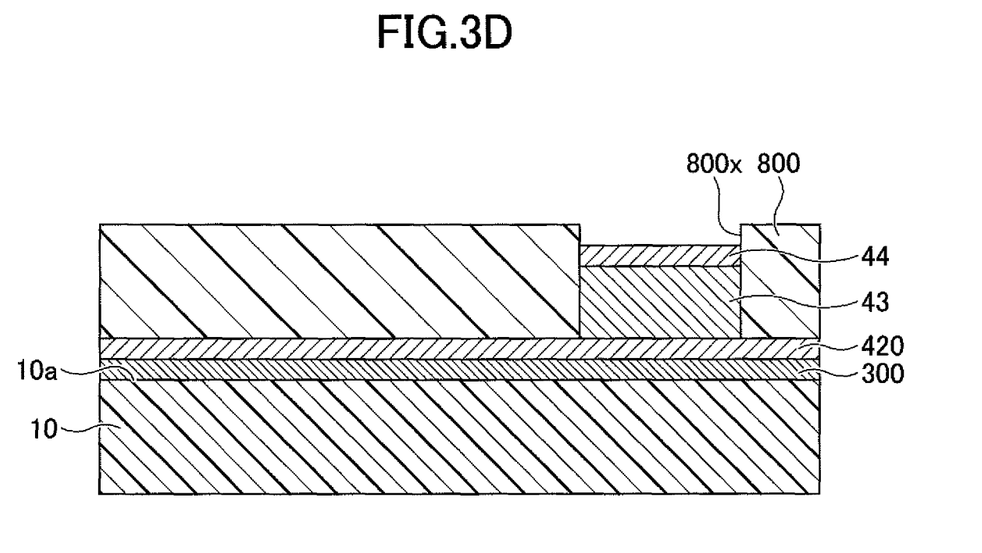
FIG. 3D is a diagram (part 4) illustrating an example of a process of manufacturing the strain gauge according to the first embodiment.

Next, in the process illustrated in FIG. 3D, a given metallic layer 43 is formed on the seed layer 420 that is exposed in the opening 800x, by for example, electrolytic plating in which the seed layer 420 is set as a power supply path, and further, a given metallic layer 44 is formed on the metallic layer 43. The electrolytic plating is suitable because it has high takt and allows for formation of an electrolytically plated layer having low stress, as the metallic layer 43. When the electrolytically plated layer whose thickness is increased has low stress, the warp in the strain gauge 2 can be prevented. Note that the metallic layer 44 may be formed on the metallic layer 43, by electroless plating.

Note that in forming the metallic layer 44, side surfaces of the metallic layer 43 are coated with the resist 800, so that the metallic layer 44 is formed only on the upper surface of the metallic layer 43 and is not on the side surfaces thereof.

Figure 4A:
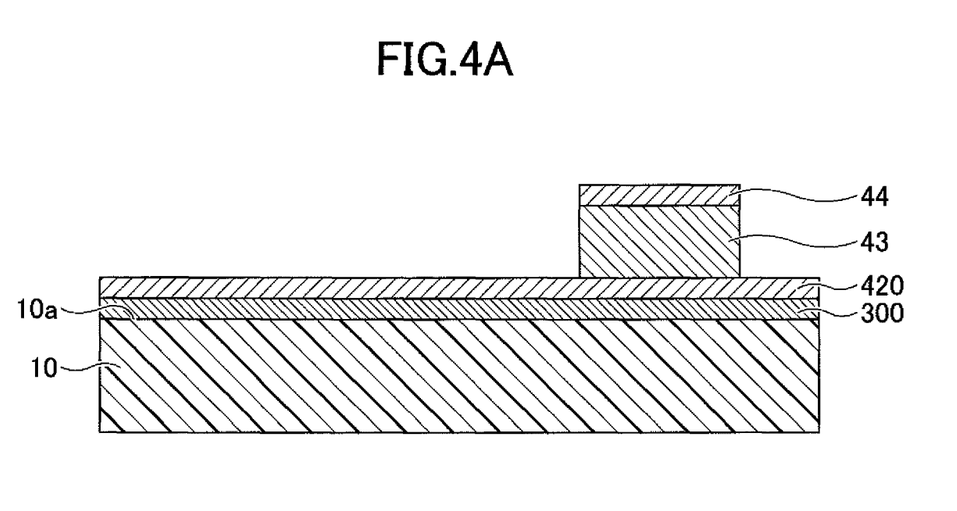
FIG. 4A is a diagram (part. 5) illustrating an example of the process of manufacturing the strain gauge according to the first embodiment.

Next, in the process illustrated in FIG. 4A, the resist 800 illustrated in FIG. 3D is removed. The resist 800 can be removed by, for example, immersing the material of the resist 800 in a dissolvable solution.

Figure 4B:
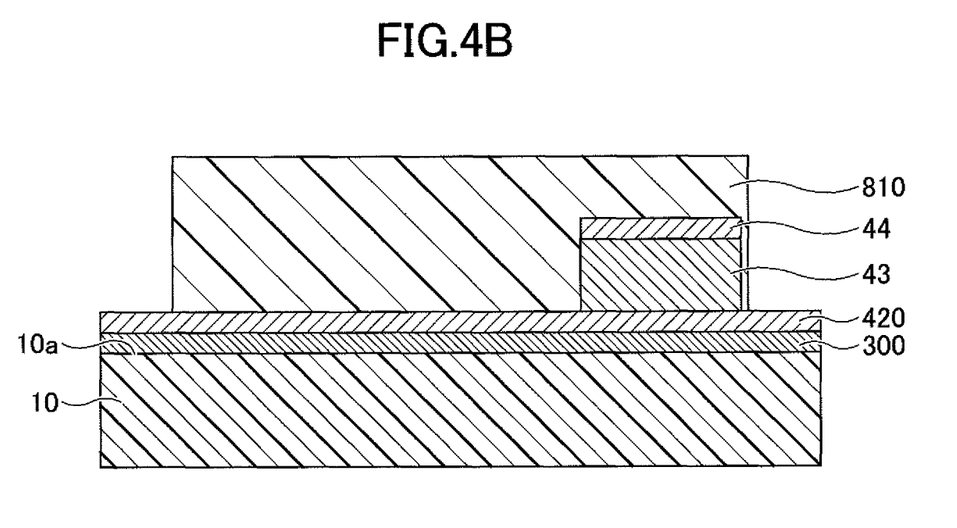
FIG. 4B is a diagram (part 6) illustrating an example of the process of manufacturing the strain gauge according to the first embodiment.

Next, in the process illustrated in FIG. 4B, a photosensitive resist. 810 is formed on the entire upper surface of the seed layer 420, and by exposing and developing, a planar shape that is the same as that of the resistor 30 and terminal sections 41 in FIG. 1 is patterned. As the resist 810, for example, a dry film resist, or the like can be used.

Figure 4C:
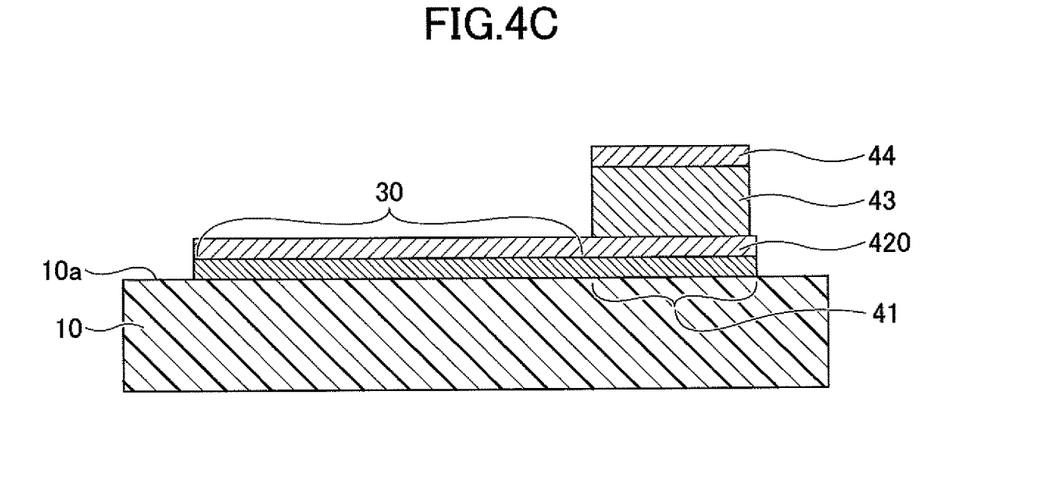
FIG. 4C is a diagram (part 7) illustrating an example of the process of manufacturing the strain gauge according to the first embodiment.

Next, in the process illustrated in FIG. 4C, the resist 810 is used as an etch mask, and the metallic layer 300 and the seed layer 420 that are exposed from the resist 310 are removed, so that the resistor 30 and the terminal sections 41 each of which has the planar shape in FIG. 1 are formed. For example, with wet etching, unwanted portions of the metallic layer 300 and the seed layer 420 can be removed. When a functional layer is formed in a lower layer of the metallic layer 300, the functional layer is patterned in the planar shape illustrated in FIG. 1, with etching, as is the case with the resistor 30 and the terminal sections 41. Note that at this point, the seed layer 420 is formed on the resistor 30.

Figure 4D:
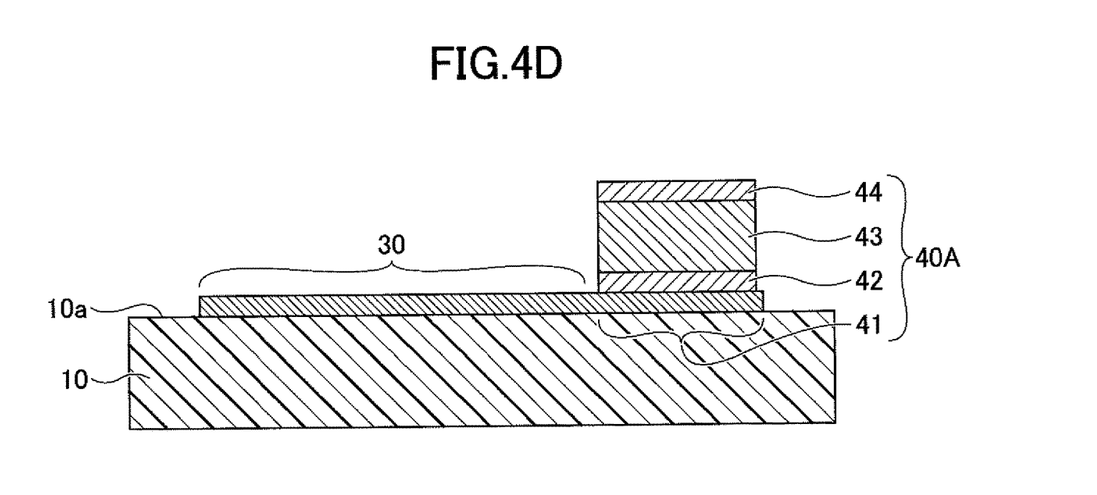
FIG. 4D is a diagram (part 8) illustrating an example of the process of manufacturing the strain gauge according to the first embodiment.

Next, in the process illustrated in FIG. 4D, the metallic layer 43 and the metallic layer 44 are used as etch masks, and an unwanted seed layer 420 that is exposed from the metallic layer 43 and the metallic layer 44 is removed, so that the metallic layer 42 is formed. For example, by wet etching using etching liquid with which the seed layer 420 is etched and with which the functional layer and the resistor 30 are not etched, the unwanted seed layer 420 can be removed.

After the process illustrated in FIG. 4D, the cover layer 60 with which the resistor 30 is coated and that exposes the electrodes 40A is formed on and above the upper surface 10a of the substrate 10, so that the strain gauge 2 is completed.

For example, the cover layer 60 can be fabricated, such that a thermosetting insulating resin film in a semi-cured state is laminated on the upper surface 10a of the substrate 10, and such that the resistor 30 is coated therewith and the terminal sections 41 are exposed; subsequently, heat is added and curing is performed. The cover layer 60 may be formed, such that a thermosetting insulating resin that, is liquid or paste-like is applied to the upper surface 10a of the substrate 10, and such that the resistor 30 is coated therewith and the terminal sections 41 are exposed, subsequently, heat is added and curing is performed.

Figure 5:
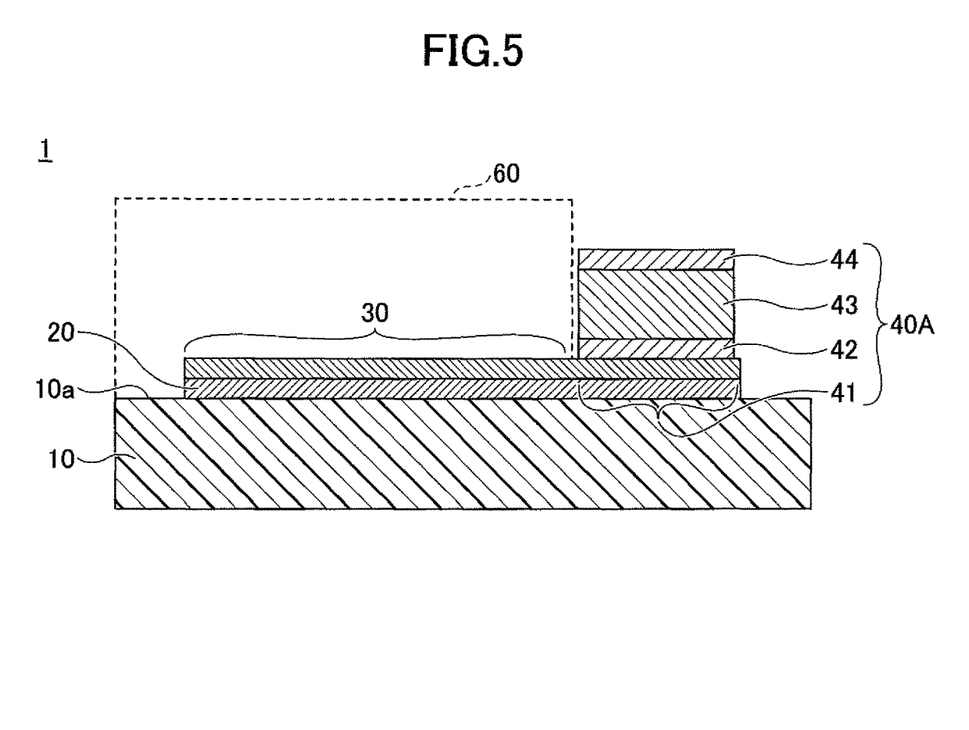
FIG. 5 is a cross-sectional view (part: 2) of an example of a strain gauge according to the first embodiment.

Note that when the functional layer, as a base layer of the resistor 30 and the terminal sections 41 is provided on the upper surface 10a of the substrate 10, the strain gauge 1 has a cross-section shape illustrated in FIG. 5. A layer expressed by the numeral 20 indicates the functional layer. The planar shape of the strain gauge 1 in the case of providing the functional layer 20 is the same as that in FIG. 1.

As described above, as each electrode 40A, a given metallic layer 43 formed of a thick film (1 µm or more), which is formed of Cu, a Cu alloy, Ni, or a Ni alloy, is formed above a given terminal section 41 and further, a given metallic layer 44 formed of material (Au or Pt) that has better solder wettability than the metallic layer 43 is formed in the outermost surface layer. Thereby, dissolution of metallization can be prevented, as well as improving solder wettability.

Modification 1 of the First Embodiment

Modification 1 of the first embodiment provides an example of electrodes each having a layer structure different from that in the first: embodiment. Note that in the modification 1 of the first embodiment, the explanation for the same components as the embodiment that has been described may be omitted.

Figure 6:
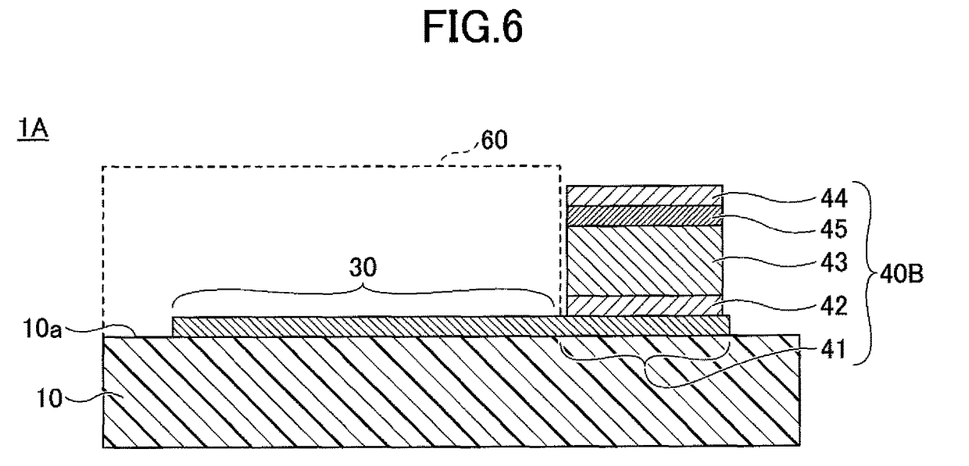
FIG. 6 is a cross-sectional view of an example of a strain gauge according to modification 1 of the first embodiment.

FIG. 6 is a cross-sectional view illustrating an example of a strain gauge according to the modification 1 of the first embodiment, and illustrates a cross section corresponding to FIG. 2. With reference to FIG. 6, the strain gauge 1A differs from the strain gauge 1 (see FIG. 2, etc.) in that the electrodes 40A are replaced with electrodes 40B. Note that the cover layer 60 may be provided to cover all portions except for the electrodes 40B.

Each electrode 40B has a laminated structure in which a plurality of metallic layers are laminated. Specifically, each electrode 40B includes a terminal section 41 extending from a corresponding end portion from among both end portions of the resistor 30; a metallic layer 42 formed on an upper surface of the terminal section 41; a metallic layer 43 formed on an upper surface of the metallic layer 42; a metallic layer 45 formed on an upper surface of the metallic layer 43; and a metallic layer 44 formed on an upper surface of the metallic layer 45. In other words, each electrode 40B has a structure in which the metallic layer 45 is provided between the metallic layer 43 and the metallic layer 44 of a given electrode 40A.

The material of the metallic layer 45 is not particularly restricted, and can be appropriately selected for any purpose. For example, Ni can be used. Instead of Ni, NiP (nickel phosphorus) or Pd may be used. Also, as the metallic layer 45, Ni/Pd (a metallic layer in which a Ni layer and a Pd layer are laminated in this order) may be used. The thickness of the metallic layer 45 is not particularly restricted, and can be appropriately selected for any purpose. For example, the thickness is approximately between 1 µm and 2 µm.

In the process illustrated in FIG. 3D, the metallic layer 45 can be formed on the metallic layer 43 by, for example, electrolytic plating in which the seed layer 420 is set as a power supply path.

In such a manner, the number of electrode layers is not particularly restricted, and the number of layers may be increased as necessary. In this case as well, a given metallic layer 43 formed of a thick film (1 μm or more), which is formed of Cu, a Cu alloy, Ni, or a Ni alloy, is formed above a given terminal section 41, and further, a given metallic layer 44 formed of material (Au or Pt) that has better solder wettability than the metallic layer 43 is formed in the outermost surface layer. Thereby, as is the case with the first embodiment, the dissolution of metallization can be prevented, as well as improving the solder wettability.

Modification 2 of the First Embodiment

Modification 2 of the first embodiment provides another example of electrodes each having a different layer structure from that in the first embodiment. Note that in the modification 2 of the first embodiment, the explanation for the same components as the embodiment that has been described may be omitted.

Figure 7:
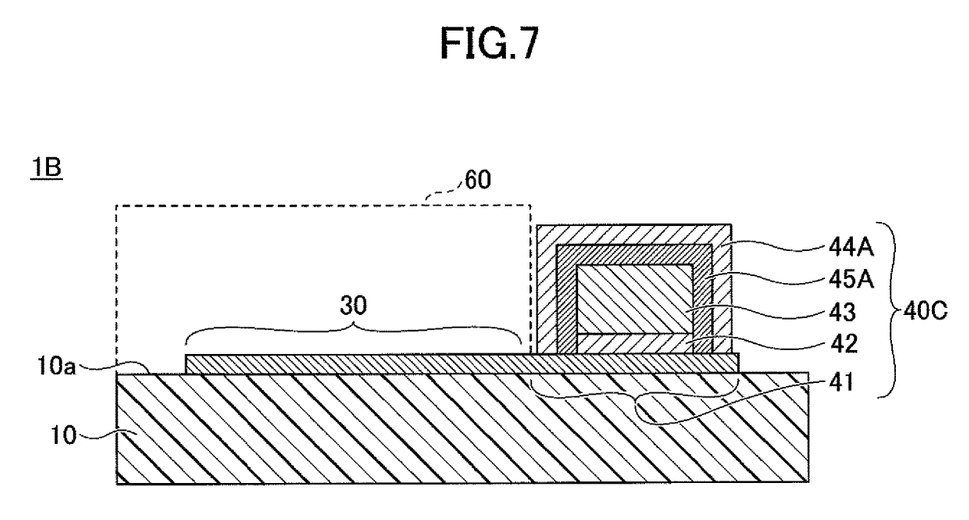
FIG. 7 is a cross-sectional view of an example of a strain gauge according to modification 2 of the first embodiment.

FIG. 7 is a cross-sectional view illustrating an example of a strain gauge according to the modification 2 of the first embodiment, and illustrates a cross section corresponding to FIG. 2. With reference to FIG. 7, the strain gauge 1B differs from the strain gauge 1A (see FIG. 6) in that the electrodes 40B are replaced with electrodes 40C. Note that the cover layer 60 may be provided to cover all portions except for the electrodes 40C.

Each electrode 40C has a laminated structure in which a plurality of metallic layers are laminated. Specifically, each electrode 40C includes a terminal section 41 extending from a corresponding end portion from among both end portions of the resistor 30; a metallic layer 42 formed on an upper surface of the terminal section 41; a metallic layer 43 formed on an upper surface of the metallic layer 42; a metallic layer 45A formed on an upper surface and side surfaces of the metallic layer 43 and on side surfaces of the metallic layer 42; and a metallic layer 44A formed on an upper surface and side surfaces of the metallic layer 45A. For example, the material and thickness of the metallic layers 44A and 45A can be the same as the material and thickness of the metallic layers 44 and 45. Note that the metallic layer 44A is a typical example of a second metallic layer according to the present invention.

In order to form each electrode 40C, first, in the process illustrated in FIG. 3D, for example, a given metallic layer 43 is formed by, for example, electrolytic plating in which the seed layer 420 is set as a power supply path, and then the resist 800 is removed as is the case with the process illustrated in FIG. 4A, without forming a given metallic layer 44. Next, the same process as that in FIGS. 4B to 4D is performed. Subsequently, a given metallic layer 45A can be formed on the upper surface and side surfaces of the metallic layer 43 and on side surfaces of the metallic layer 42, by electroless plating, for example. Additionally, a given metallic layer 44A can be formed on the upper surface and side surfaces of the metallic layer 45A, by electroless plating, for example.

As described above, each electrode can be fabricated by appropriately using both of electrolytic plating and electroless plating. In the structure of each electrode 40C, a given metallic layer 43 formed of a thick film (1 μm or more), which is formed of Cu, a Cu alloy, Ni, or a Ni alloy, is formed above a given terminal section 41, and further a given metallic layer 44A formed of material (Au or Pt) that has better solder wettability than the metallic layer 43 is formed in the outermost layer. Note, however, that the metallic layer 44A of the outermost layer is formed, via the metallic layer 45A toward the side surfaces of each of the metallic layers 42 and 43, in addition to the upper surface of the metallic layer 43. Thus, in comparison to the electrodes 40A or the electrodes 40B, the effect of preventing oxidation and corrosion of Cu, a Cu alloy, Ni, or a Ni alloy that constitutes the metallic layer 43 can be further enhanced, as well as the solder wettability being able to be further improved.

Mote that the same effect is obtained even when a given metallic layer 44A is formed directly on the upper surface and side surfaces of a given metallic layer 43 and on the side surfaces of a given metallic layer 42, without forming a given metallic layer 45A. In other words, the metallic layer 44A may directly or indirectly cover the upper surface and side surfaces of the metallic layer 43 and the side surfaces of the metallic layer 42.

EXAMPLE 1

In Example 1, multiple strain gauges 1A each of which includes the electrodes 40B were fabricated.

First, Ti as the functional layer 20, which had a film thickness of 3 nm, was vacuum-deposited on the upper surface 10*a* of the substrate 10 that was formed of a polyimide resin having a thickness of 25 μm, by conventional sputtering.

Then, patterning was finally performed on the functional layer 20, by magnetron sputtering, so that the metallic layer 300 that constituted the resistor 30 and the terminal sections 41 was deposited.

Next, the process illustrated in FIGS. 3B to 4D was modified as described in the modification 1 of the first embodiment, the strain gauge 1A with the electrodes 40B was fabricated, and the presence or absence of dissolution of metallization was checked. Specifically, 10 types of samples in each of which Cu was used for the metallic layers 42 and 43, in each of which NiP was used for the metallic layer 45, in each of which Au was used for the metallic layer 44, and in each of which the thickness of a given metallic layer was changed were fabricated (samples No. 1 to No. 10), and then the presence or absence of dissolution of metallization was checked.

Table 1 shows results. Note that in Table 1, the film thickness "0" indicates that no metallic layer was formed. The "poor" indicates that dissolution of metallization occurred in soldering being first performed. The "good" indicates that although no dissolution of metallization occurred in soldering being first performed, little dissolution of metallization occurred in soldering being performed second (where soldering refinement, etc. was assumed). Additionally, the "excellent" indicates that dissolution of metallization occurred neither in soldering being performed first nor second.

TABLE 1

| SAMPLE | EACH FILM THICKNESS [μm] | | | SOLDERABILITY |
|---|---|---|---|---|
| No. | Cu | NiP | Au | |
| 1 | 0.5 | 0 | 0 | POOR PRESENCE OF DISSOLUTION OF METALLIZATION |
| 2 | 0.5 | 0 | 0.1 | POOR PRESENCE OF DISSOLUTION OF METALLIZATION |

TABLE 1-continued

| SAMPLE No. | EACH FILM THICKNESS [μm] | | | SOLDERABILITY |
|---|---|---|---|---|
| | Cu | NiP | Au | |
| 3 | 0.5 | 0 | 0.8 | POOR PRESENCE OF DISSOLUTION OF METALLIZATION |
| 4 | 1 | 1 | 0.1 | GOOD ABSENCE OF DISSOLUTION OF METALLIZATION |
| 5 | 3 | 0 | 0 | EXCELLENT ABSENCE OF DISSOLUTION OF METALLIZATION |
| 6 | 3 | 0 | 0.1 | EXCELLENT ABSENCE OF DISSOLUTION OF METALLIZATION |
| 7 | 3 | 0 | 0.8 | EXCELLENT ABSENCE OF DISSOLUTION OF METALLIZATION |
| 8 | 3 | 1 | 0.1 | EXCELLENT ABSENCE OF DISSOLUTION OF METALLIZATION |
| 9 | 5 | 1 | 0.1 | EXCELLENT ABSENCE OF DISSOLUTION OF METALLIZATION |
| 10 | 8 | 1 | 0.1 | EXCELLENT ABSENCE OF DISSOLUTION OF METALLIZATION |

As shown in Table 1, it was confirmed that when the thickness of Cu was 1 μm or more, dissolution of metallization was improved, and that when the thickness was 3 μm or more, the dissolution of metallization was further improved. Additionally, from the results for sample 1 and sample 5, it was confirmed that the presence or absence of dissolution of metallization was determined only according to the thickness of Cu and was not determined upon the presence or absence of each of NiP and Au. Note, however, that as described above, in order to prevent dissolution of metallization and improve solder wettability, a metallic layer formed of Au or an equivalent material (Pt, etc.) is required.

Then, the gauge characteristics of each sample in Example 1 were measured. As a result, the gauge factor of each sample in Example 1 was between 14 and 16. Also, for each sample in Example 1, the gauge factor temperature coefficient TCS and temperature coefficient of resistance TCR were each in the range of from −1000 ppm/° C. to +1000 ppm/° C.

As described above, with the functional layer 20 formed of Ti being provided, crystal growth of α-Cr was promoted and a Cr composite film was formed with α-Cr as the main component, so that a strain gauge that had a gauge factor of 10 or more, and that had the gauge factor temperature coefficient TCS and temperature coefficient of resistance TCR being each in the range of from −1000 ppm/° C. to +1000 ppm/° C., was fabricated. Mote that the diffusion effect of Ti into the Cr composite film is considered to cause the improvement in the gauge characteristics.

The preferred embodiment and the like have been described above in detail, but are not limited thereto. Various modifications and alternatives to the above embodiment and the like can be made without departing from a scope set forth in the claims.

This International application claims priority to Japanese Patent Application Nos. 2017-191823, filed Sep. 29, 2017, and 2018-052421, filed Mar. 20, 2018, the contents of which are incorporated herein by reference in their entirety.

REFERENCE SIGNS LIST

1, 1A, 1B strain gauge, 10 substrate, 10a upper surface, 20 functional layer, 30 resistor, 41 terminal section, 40A, 40B, 40C electrode, 42, 43, 44, 44A, 45, 45A metallic layer, 60 cover layer

The invention claimed is:

1. A strain gauge comprising:
a flexible resin substrate;
a functional layer formed of a metal, an alloy, or a metal compound, directly on one surface of the substrate, the functional layer promoting crystal growth of a resistor;
the resistor formed of a film that includes Cr, CrN, and $Cr_2N$ and into which an element included in the functional layer is diffused, the resistor being provided on one surface of the functional layer, and the film of the resistor being formed with alpha-chromium as a main component; and
electrodes electrically coupled to the resistor,
wherein a gauge factor of the strain gauge is 10 or more, and
wherein each electrode includes:
a terminal section extending from a corresponding end portion from among end portions of the resistor;
a first metallic layer formed of copper, a copper alloy, nickel, or a nickel alloy, on or above the terminal section; and
a second metallic layer formed of material having better solder wettability than the first metallic layer, on or above the first metallic layer, and
wherein the functional layer including the element that is diffused into the film of the resistor defines a growth face of the alfa-chromium of the resistor.

2. A strain gauge comprising:
a flexible resin substrate;
a functional layer formed of a metal, an alloy, or a metal compound, directly on one surface of the substrate, the functional layer promoting crystal growth of a resistor;
the resistor formed of a film that includes Cr, CrN, and $Cr_2N$ and into which an element included in the functional layer is diffused, the resistor being provided on one surface of the functional layer, and the film of the resistor being formed with alpha-chromium as a main component; and
electrodes electrically coupled to the resistor,
wherein a temperature coefficient of resistance of the strain gauge is in a range of from −1000 ppm/° C. to +1000 ppm/° C., and
wherein each electrode includes:
a terminal section extending from a corresponding end portion from among end portions of the resistor;
a first metallic layer formed of copper, a copper alloy, nickel, or a nickel alloy, on or above the terminal section; and
a second metallic layer formed of material having better solder wettability than the first metallic layer, on or above the first metallic layer, and
wherein the functional layer including the element that is diffused into the film of the resistor defines a growth face of the alfa-chromium of the resistor.

3. A strain gauge comprising:
a flexible resin substrate;
a functional layer formed of a metal, an alloy, or a metal compound, directly on one surface of the substrate, the functional layer promoting crystal growth of a resistor;
the resistor formed of a film including Cr, CrN, $Cr_2N$, on one surface of the functional layer, the film of the resistor being formed with alpha-chromium as a main component; and
electrodes electrically coupled to the resistor,
wherein each electrode includes:
a terminal section extending from a corresponding end portion from among end portions of the resistor;

a first metallic layer formed of copper, a copper alloy, nickel, or a nickel alloy, on or above the terminal section; and a second metallic layer formed of material having better solder wettability than the first metallic layer, on or above the first metallic layer, and wherein the functional layer including the element that is diffused into the film of the resistor defines a growth face of the alfa-chromium of the resistor.

4. The strain gauge according to claim 1, wherein the first metallic layer is an electrolytically plated layer.

5. The strain gauge according to claim 1, wherein the second metallic layer directly or indirectly covers an upper surface and side surfaces of the first metallic layer.

6. The strain gauge according to claim 1, wherein the first metallic layer has a thickness of 1 μm or more.

7. The strain gauge according to claim 6, wherein the first metallic layer has a thickness of 3 μm or more.

8. The strain gauge according to claim 1, wherein the functional layer includes one or more metals selected from the group consisting of Cr, Ti, V, Nb, Ta, Ni, Y, Zr, Hf, Si, C, Zn, Cu, Bi, Fe, Mo, W, Ru, Rh, Re, Os, Ir, Pt, Pd, Ag, Au, Co, Mn, and Al; an alloy of any metals from among the group; or a compound of any metal from among the group.

9. The strain gauge according to claim 1, wherein the functional layer includes one or more metals selected from the group consisting of Cr, V, Nb, Ta, Ni, Y, Hf, C, Zn, Bi, Fe, Mo, W, Ru, Rh, Re, Os, Ir, Pt, Pd, Ag, Au, Co, and Mn; an alloy of any metals from among the group; or a compound of any metal from among the group.

10. The strain gauge according to claim 8, wherein the functional layer further includes one metal compound selected from the group consisting of TiN, TaN, $Si_3N_4$, $TiO_2$, $Ta_2O_5$, and $SiO_2$.

11. The strain gauge according to claim 8, wherein the functional layer further includes one metal compound selected from the group consisting of TiN, TaN, $Si_3N_4$, and $Ta_2O_5$.

12. The strain gauge according to claim 8, wherein the functional layer further includes one alloy selected from the group consisting of FeCr, TiAl, FeNi, NiCr, and CrCu.

13. The strain gauge according to claim 1, wherein the functional layer protects the resistor from oxidation; suppresses movement of oxygen and moisture present in the substrate into the resistor; and/or improves adhesion between the substrate and the resistor.

14. The strain gauge according to claim 1, wherein the functional layer is patterned in a same planar shape as the resistor.

15. The strain gauge according to claim 1, wherein the functional layer has a thickness of from 1 nm to 100 nm.

* * * * *